United States Patent
Tagawa et al.

(10) Patent No.: US 7,128,853 B2
(45) Date of Patent: Oct. 31, 2006

(54) METHOD AND APPARATUS FOR MANUFACTURING A RUBBER SHEET CONTAINING SHORT FIBERS

(75) Inventors: Takyuki Tagawa, Hyogo (JP);
Toshihiro Yamada, Hyogo (JP);
Naokazu Yamaguchi, Hyogo (JP);
Toshihiro Nishimura, Hyogo (JP)

(73) Assignee: Mitsuboshi Belting Ltd., Kobe (JP)

( * ) Notice: Subject to any disclaimer, the term of this patent is extended or adjusted under 35 U.S.C. 154(b) by 233 days.

(21) Appl. No.: 10/361,470

(22) Filed: Feb. 10, 2003

(65) Prior Publication Data

US 2004/0046275 A1    Mar. 11, 2004

(30) Foreign Application Priority Data

Sep. 11, 2002    (JP)    .............................. 2002-265962

(51) Int. Cl.
*B29C 47/20*    (2006.01)
(52) U.S. Cl. .................. 264/37.32; 264/146; 264/159; 264/209.1
(58) Field of Classification Search ............. 264/37.32, 264/146, 159, 160, 161, 209.1, 211, 211.21, 264/209.4, 211.13, 211.12, 400, 444
See application file for complete search history.

(56) References Cited

U.S. PATENT DOCUMENTS

| | | | | |
|---|---|---|---|---|
| 3,342,657 | A | * | 9/1967 | Dyer ........................... 156/163 |
| 3,482,280 | A | * | 12/1969 | Ronden ....................... 425/4 R |
| 3,591,895 | A | * | 7/1971 | Britt et al. .................. 425/72.1 |
| 3,909,176 | A | * | 9/1975 | Madonini ................. 425/305.1 |
| 4,013,745 | A | * | 3/1977 | Brinkmann et al. ...... 264/37.32 |
| 4,062,712 | A | * | 12/1977 | Stark ....................... 156/244.13 |
| 4,268,239 | A | * | 5/1981 | Herrington, Jr. ............. 425/467 |
| 5,068,070 | A | * | 11/1991 | Gunji et al. ................... 264/41 |
| 5,190,711 | A | * | 3/1993 | Blemberg ............... 264/173.13 |
| 5,429,487 | A | * | 7/1995 | Tajima et al. ............... 425/72.1 |

FOREIGN PATENT DOCUMENTS

| | | |
|---|---|---|
| EP | 1338402 | 8/2003 |
| JP | 4-129721 | * 4/1992 |
| JP | 4-129722 | * 4/1992 |
| JP | 08-281770 | * 10/1996 |
| JP | 2002127225 | 5/2002 |
| JP | 2002127227 | 5/2002 |
| JP | 2003-71905 | * 3/2003 |
| JP | 2003071905 | 3/2003 |
| JP | 2003200480 | 7/2003 |
| JP | 2004-136649 | * 5/2004 |

OTHER PUBLICATIONS www.dictionary.com—definition for "adjacent". source: American Heritage Dictionary, 2000.*

* cited by examiner

*Primary Examiner*—Mark Eashoo
(74) *Attorney, Agent, or Firm*—Wood, Phillips, Katz, Clark & Mortimer

(57) ABSTRACT

A method and apparatus for manufacturing a rubber sheet containing short fibers. The method includes the steps of: mixing short fibers in a flowable rubber matrix; forming the flowable rubber matrix with the fibers therein into a cylindrical shape with a circumferential extent; separating a portion of the circumferential extent from the cylindrical shape, and forming the cylindrical shape with the portion separated into a sheet form.

23 Claims, 4 Drawing Sheets

METHOD AND APPARATUS FOR MANUFACTURING A RUBBER SHEET CONTAINING SHORT FIBERS

BACKGROUND OF THE INVENTION

1. Field of the Invention

This invention relates to rubber sheets, as used in the manufacture of power transmission belts and, more particularly, to rubber sheets containing short reinforcing fibers. The invention is directed to both a method and an apparatus for manufacturing such rubber sheets.

2. Background Art

It is known to form one or more layers of a power transmission belt from rubber with short reinforcing fibers embedded therein. It is known to mix short fibers with an unvulcanized rubber and to place the unvulcanized rubber with the fibers therein between a pair of calendar rolls operating at different rotational speeds. Through this mechanism, the lengths of the fibers orient substantially in the direction of advancement of the rubber through the cooperating rolls. The resulting sheet is then cut to a width, dictated by the particular belt configuration into which it is to be incorporated, and placed in a roll form. The sheet and one or more like sheets and/or other components are laminated to produce a desired thickness. The fibers in the sheets are oriented so that their lengths extend widthwise of a belt into which the sheets are incorporated, to increase the lateral stability thereof.

The components/layers of the belts are conventionally serially wrapped upon a drum during the manufacturing process. More particularly, a conventional manufacturing process for a V-ribbed power transmission belt, or a raw-edge V-belt, is carried out as follows. One or more sheets of a covering canvas and cushion ruber layer are wrapped onto the outer surface of a cylindrical molding drum. Load carrying cords are spirally wrapped around the cushion rubber layers. One or more compression rubber layers are wrapped in turn to complete a belt sleeve preform, which is vulcanized. The compression section of the belt may typically have a thickness defined by three to four such laminated layers. One or more layers of the sheets with the fibers embedded therein may be wound around the molding drum to produce a desired thickness in the compression section, or elsewhere.

As a practical matter, in order to consistently orient the short fibers using the process described above, the sheets must be relatively thin. This may ultimately require the superimposition of numerous sheets to produce the desired thickness for a particular sheet/layer. As a result, the manufacturing process may be complicated by having to laminate multiple sheets/layers of the rubber material having the short fibers embedded therein.

To avoid this problem, it is known to form rubber sheets of substantially greater thickness with consistently oriented short fibers using an extruding process employing an expansion die. An exemplary expansion die is shown in Japanese Examined Patent Application Publication No. 9847/1994. The expansion die therein has an annular expansion space with a diameter that increases between inlet and discharge locations. The width of the space also varies between the inlet and discharge locations. More particularly, the width at the entry location is narrower than at an intermediate location. The width at the discharge location is less than the width at the intermediate location and greater than the width at the entry location.

Japanese Unexamined Patent Application Publication No. 106602/1994 discloses an apparatus in which a cutter severs a cylindrical elastomer shape containing short fibers oriented in the circumferential direction continuously as the cylindrical shape discharges from a die. With this mechanism, an axial cut is continuously formed so as to allow the cylindrical shape to be formed into a flat sheet. Air is blown at the cylindrical shape between the die and the cutter so as to effect cooling thereof. This cooling inhibits shrinkage of the cylindrical shape in a circumferential direction as might disturb the orientation of the fibers that may occur as a result of non-uniform shrinkage. The problem of flaring is avoided by maintaining equal distances between the cut ends of the sheet and the center thereof.

In this conventional expansion die arrangement, the orientation ratio is three-dimensionally adjusted by a) controlling the space width ratios between the entry location and intermediate location and the intermediate location and discharge location, b) the radii of the entry and discharge locations, and c) the sectional areas. Because the orientation ratio is controlled by flow pressure, as dictated by the shape of the die, the orientation ratio can be changed only by changing the dies.

In the above-described prior art structure, flow of rubber is diverted from horizontal to vertical between a feeding cylinder and the expansion die. By reason of the orientation of the axis of the expansion die in a vertical direction, internal strain, such as deflection, can be made relatively small. Resultingly, the thickness of the cylindrical shape that is extruded in the expansion die can be consistently maintained. However, the construction described above has some drawbacks.

The prior art uses a cross head design which splits the incoming flow to the expansion die to effect uniform circumferential distribution of the material. Accordingly, a weld line is formed at the point of diversion. The split flow converges at a second weld line at a diametrically opposite location. The converging flows at the second weld line produce a random orientation of the fibers thereat and potentially a non-uniform thickness.

Preferably, the discharging cylindrical shape will be axially cut at the weld lines and thereafter reshaped into a sheet which is wrapped around a roll A, as shown in FIG. 5. The edges B, B' in FIG. 5, bounding the cut produced at C, expand at an angle a, a' to vertical, between the point of incision at C and the location where the roll A is located. Accordingly, portions of the cylindrical shape are significantly stretched vertically to facilitate the rolling shown in FIG. 5, whereas other portions, such as those diametrically opposite to the incision location, are not vertically stretched to any significant extent. It has been found that when the lengths D, D' of the edges B, B', between the incision location and the locations E, E' at which the edges B, B' engage the roll A, exceed a certain value, the elongation of the cylindrical shape may remain as a permanent strain, thus causing a flaring phenomenon upon the finished sheet.

SUMMARY OF THE INVENTION

In one form, the invention is directed to a method of manufacturing a rubber sheet containing short fibers. The method includes the steps of: mixing short fibers in a flowable rubber matrix; forming the flowable rubber matrix with the fibers therein into a cylindrical shape with a circumferential extent; separating a portion of the circumferential extent from the cylindrical shape; and forming the cylindrical shape with the portion separated into a sheet form.

The step of forming the rubber matrix may involve orienting the short fibers so that the lengths thereof extend in a circumferential direction in the cylindrical shape.

The step of forming the cylindrical shape may involve continuously forming the cylindrical shape into a sheet form while separating the portion of the circumferential extent from the cylindrical shape.

The step of forming the flowable rubber matrix may involve extruding the flowable rubber matrix in an annular expansion die.

In one form, the cylindrical shape has a first axis and the step of forming the flowable rubber matrix involves directing the flowable rubber matrix into an annular die in a direction substantially orthogonal to the first axis.

The step of forming the flowable rubber matrix may involve causing the flowable rubber matrix to flow in circumferentially opposite directions around the first axis and meet at weld line, with the step of separating a portion of the cylindrical shape involving separating a portion including the weld line.

The step of forming the flowable rubber matrix may involve advancing the flowable rubber matrix through an extruding screw, with the extruding screw having a second axis that is substantially orthogonal to the first axis.

The step of forming the flowable rubber matrix may involve extruding the flowable rubber matrix in an annular expansion die having a conical shape.

The method may further include the step of reprocessing a portion of the cylindrical shape to form a part of a rubber sheet containing short fibers.

The step of separating a portion of the cylindrical shape may involve separating a portion having a circumferential width between circumferentially spaced ends, with the weld line between and spaced from each of the circumferentially spaced ends.

In one form, the separated portion of the circumferential extent is in the range of 5–25% of the total circumferential extent.

In one form, the cylindrical shape has a first axis, the sheet has an edge formed at where the portion is separated, and the step of forming the cylindrical shape into a sheet involves stretching the cylindrical shape so that the cylindrical shape has an elongation ratio $E_1$ at the edge along the first axis and an elongation ratio $E_2$ along the first axis at a location spaced circumferentially from the edge, with $E_1-E_2$ within the range of 0 to 5.

In one form, the step of forming the flowable rubber matrix involves forming the flowable rubber matrix into a cylindrical shape having a first axis extending in a vertical direction.

The step of separating a portion of the cylindrical shape may involve tensioning the cylindrical shape in a circumferential direction as the portion of the cylindrical shape is separated.

The tensioning of the cylindrical shape may involve directing a compressed fluid against a radially inwardly facing surface.

The method may further include the step of cooling the cylindrical shape as the portion of the cylindrical shape is separated.

In one form, the cylindrical shape has a radially inwardly facing surface and a radially outwardly facing surface, with the step of cooling the cylindrical shape involving spraying a cooling fluid against the radially inwardly facing surface.

The cooling fluid may be at least one of air and a compressed gas.

The method may further include the step of cooling the annular expansion die.

In one form, the expansion die has a first element and a cooperating second element surrounding the first element, with the step of cooling the annular expansion die involving circulating a cooling fluid through at least one of the first and second elements.

The step of separating a portion of the cylindrical shape may involve cutting the cylindrical shape using one of a knife, a laser cutter, a heated knife, and an ultrasonic vibrational cutter.

The method may further include the step of continuously wrapping the sheet form around a roll as the sheet form is formed.

The invention is further directed to an apparatus for manufacturing a rubber sheet containing short fibers, each with a length. The apparatus has a first space in which a flowable rubber matrix can be mixed with short fibers, an annular expansion space in communication with the first space and having a discharge port through which a cylindrical shape formed in the annular expansion space discharges, and a cutting assembly having first and second spaced cutting portions for separating a circumferential portion of a cylindrical shape discharging through the discharge port.

In one form, the first space has an extruding screw therein for mixing and advancing a flowable rubber matrix with fibers along a first axis.

In one form, the annular expansion space has a second axis that is transverse to the first axis and the first space and annular expansion space are relatively situated so that the flowable rubber matrix with short fibers therein is directed along the first axis from the first space into the annular expansion space so that short fibers are oriented with the lengths of the short fibers extending circumferentially around the cylindrical shape within the annular expansion space.

In one form, the flowable rubber matrix with fibers therein in the first space is introduced to the annular expansion space at a first location, with the cutting assembly located diametrically oppositely to the first location.

The apparatus may further include a collecting receptacle for accumulating portions of the cylindrical shape removed by the cutting assembly.

The apparatus may further include a winding assembly having a roll around which rubber sheet containing short fibers can be continuously wrapped.

In one form, the second axis extends in a vertical direction.

In one form the first axis is substantially orthogonal to the second axis.

The apparatus may further include at least one nozzle for directing a fluid at a cylindrical shape discharging through the discharge port to thereby one of cool and circumferentially expand a cylindrical shape discharging through the discharge port.

The apparatus may further include at least one of a source of air and a compressed fluid to be supplied to the at least one nozzle.

The apparatus may be provided in combination with a flowable rubber matrix having short fibers therein.

DETAILED DESCRIPTION OF THE DRAWINGS

Figure 1:
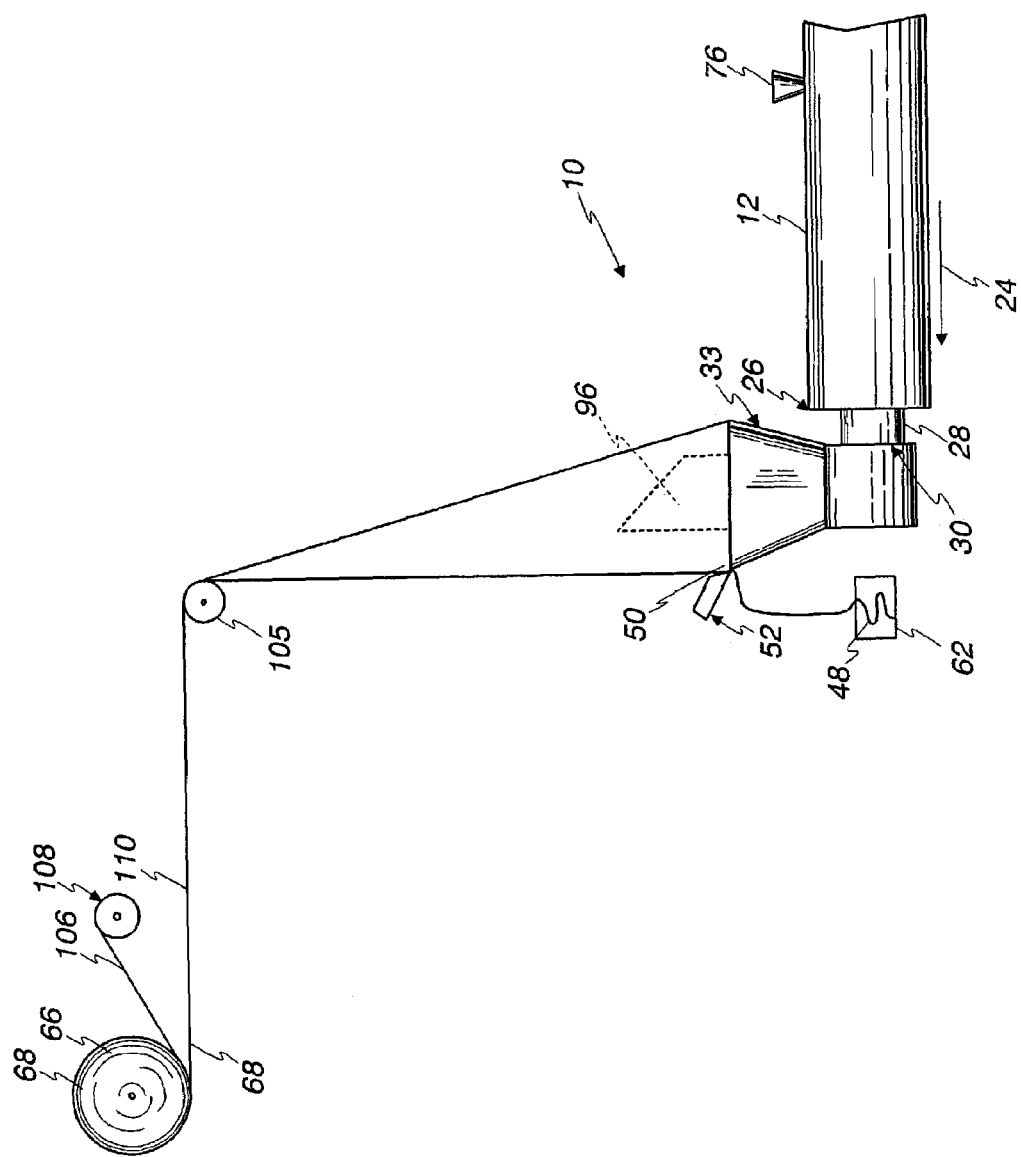
FIG. 1 is a schematic representation of an apparatus for manufacturing a rubber sheet containing short fibers, according to the present invention.
Figure 2:
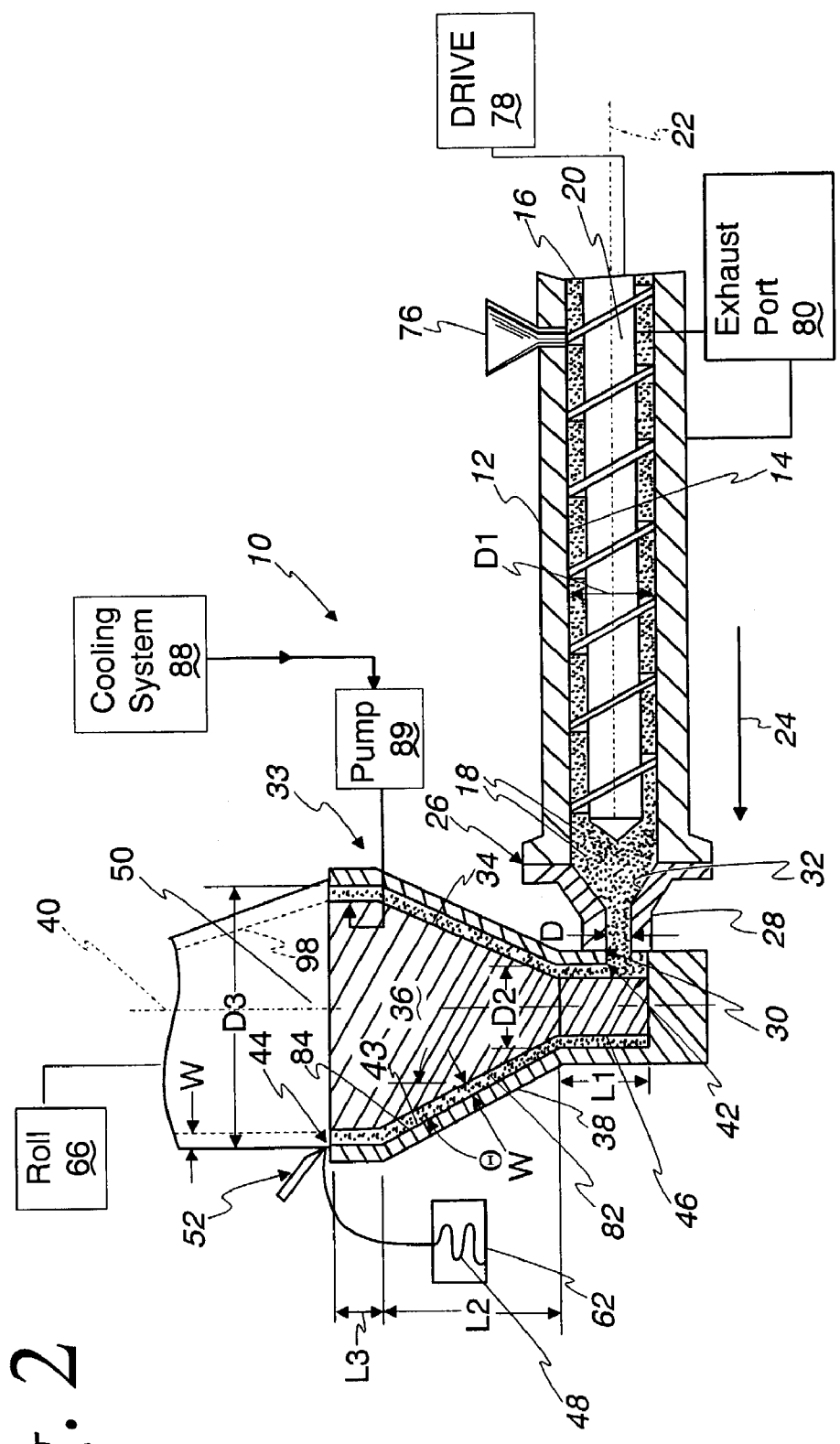
FIG. 2 is a cross-sectional view of a part of the inventive apparatus in FIG. 1.
Figure 3:
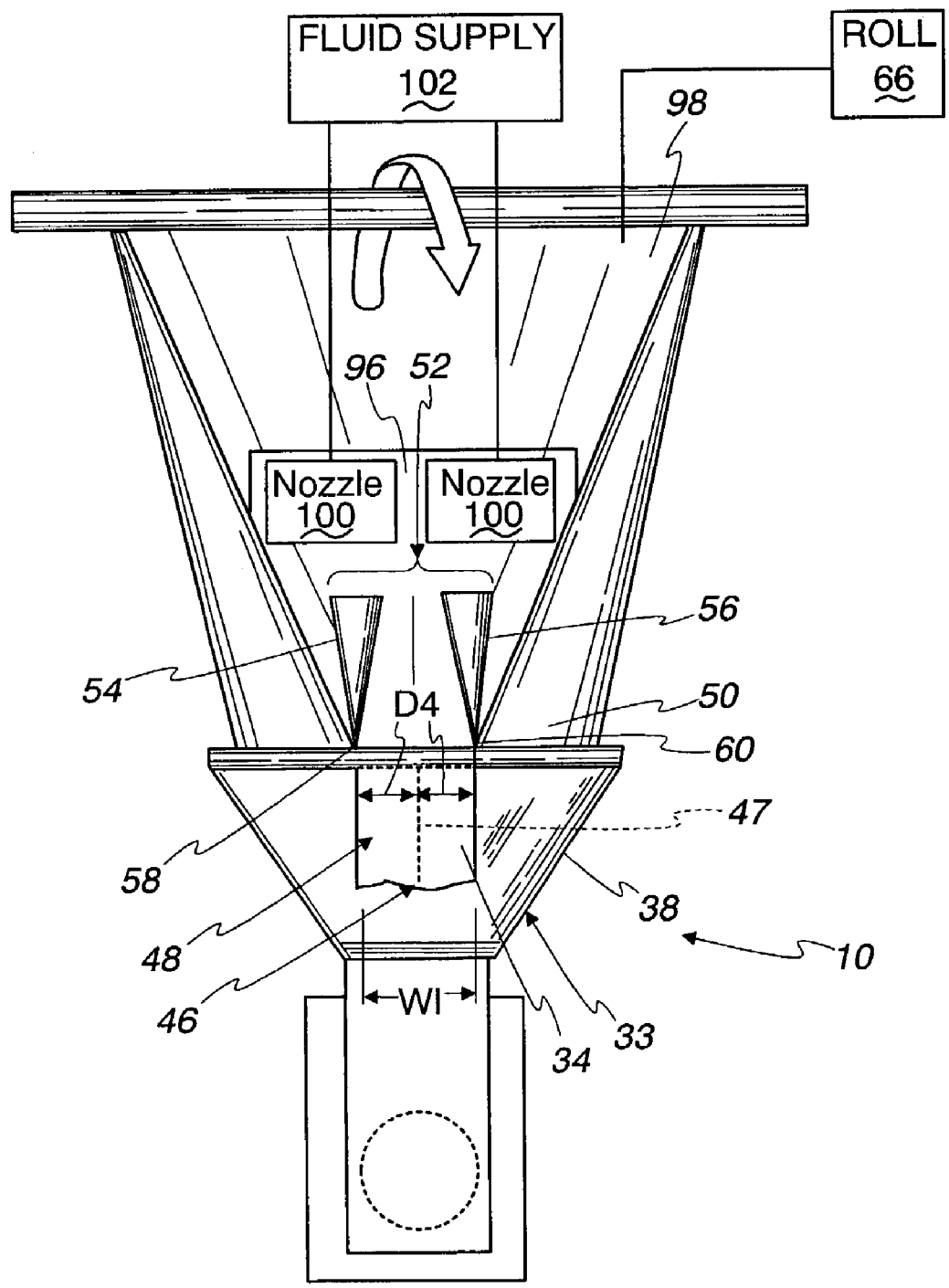
FIG. 3 is an elevation view of the inventive apparatus 1 taken from the left side of FIG. 1.

Referring initially to FIGS. 1–3, an apparatus for manufacturing a rubber sheet containing short fibers, according to the present invention, is shown at 10. The apparatus 10 has a cylinder 12 with an internal cylindrical space 14 within which a flowable rubber 16 containing short fibers 18 is mixed/kneaded. An extruding screw 20 within the space 14 is rotated to mix and knead the rubber/fiber mix and effect advancement thereof along the rotational axis 22 of the screw 20 in the direction of the arrow 24. At the downstream end 26 of the cylinder 12, a nozzle 28 is provided. The nozzle 28 has an outlet end 30 with a diameter D that is reduced from the diameter D1 of the space 14. A transition nozzle portion 32 converges from the cylinder diameter D1 to the outlet diameter D.

The cylinder 12 connects through the nozzle 28 to an annular expansion die 33. The space 14 communicates through the nozzle 28 to an annular space 34 defined by the expansion die 33. The annular space 34 is defined between a first die element 36 and a second die element 38 which surrounds the first die element 36. The die elements 36, 38 are configured so that the annular space 34 has a substantially uniform width W throughout. The cylinder 12 and die elements 36, 38 are arranged so that the axis 22 coincides with the central axis 40 of the annular space 34 bounded by the die elements 36, 38. The axes 22, 40 are substantially orthogonal, with the axis 40 extending in a vertical direction.

With this arrangement, the flowable rubber 16 with the short fibers 18 therein is introduced to the annular space 34 at an inlet location 42 adjacent to the bottom of the annular space 34. Near the inlet location 42, the annular space 34 has a vertical length L1 with a substantially uniform diameter D2. The annular space 34 increases in diameter progressively over a conically-shaped portion 43 thereof having a vertical length L2. At a discharge port/location 44 at the top of the annular space 34, the annular space 34 has its largest diameter D3, which extends over a length L3 at the top of the annular space 34. Accordingly, the annular space 34 functions as an expansion chamber in which incoming flowable rubber 16 with fibers 18 therein is distributed, with the circumferential tension on the rubber/fibers increasing from bottom to top.

Because the axes 22, 40 coincide, the kneaded rubber 16 with fibers 18 mixed therein communicating from the space 14 into the annular expansion space 34 is caused to divert and flow circumferentially around the axis 40 in opposite directions from the inlet location 42. At a location at 46, diametrically opposite to the inlet location 42, the circumferentially oppositely flowing rubber 16 with fibers 18 therein converges at a vertical weld line 47. In the two converging flows, the lengths of the fibers 18 are consistently circumferentially aligned. At the weld line 47, the collision of the oppositely moving flows causes the fibers 18 to randomly orient. A weld line (not shown) also forms at the inlet location 42 at which rubber flow, incoming in a horizontal direction from the cylinder 12, is diverted to vertical for expansion into the annular expansion space 34.

According to the invention, a circumferential portion 48 of a cylindrical shape 50 discharging from the annular expansion space 34 and having the diameter D3, is removed. The removed portion 48 is selected so as to include the weld line 47 and a circumferential width D4 extending in opposite directions therefrom, so as to eliminate the weld line 47 and rubber in the vicinity thereof in which randomly oriented fibers 18 are embedded. To effect this, a cutting assembly 52 is provided at the discharge location 44 diametrically opposite to where the rubber 16 is introduced to the annular expansion space 34 from the cylinder 12. The portion 48 of the cylindrical shape 50 that is removed is severed by spaced cutting portions 54, 56 on the cutting assembly 52, with cutting edges 58, 60, respectively, each spaced from the weld line 47 the circumferential distance D4. The circumferential distance D4 is preferably variable.

The cutting takes place immediately at the discharge location 44 and is done in a manner which allows the portion 48 to be continuously separated and delivered to an accumulation receptacle 62. The accumulated portions 48 can be reintroduced to the cylinder 12 for reprocessing. The remainder of the cylindrical shape 50 is drawn upwardly to a roll 66 upon which the cut cylindrical shape 50 is reconfigured and wrapped in the form of a sheet 68.

A manufacturing operation for the sheet 68 will now be described in greater detail. A master batch of rubber 16 and fiber 18 is delivered to the upstream end of the cylinder 12 through a suitable charging port 76. As the rubber 16 and fibers 18 are input, the extruding screw 20 is rotated continuously through a drive 78 about its axis 22. Gas that is produced from the air and rubber mixture in the space 14 is discharged through an appropriate exhaust port 80. Depending upon the nature of the rubber 16, the temperature in the space 14 is typically desirably within the range of 40–100° C. The fibers 18 and rubber 16 are heated to a temperature that permits thorough mixing for thermoplasticizing to achieve a satisfactorily extrudable and moldable state. The kneading time is controlled so that the vulcanization of the rubber is not accelerated.

The flowable rubber 16, with the fibers 18 therein, is delivered by the extruding screw 20 from the chamber 14 into and through the nozzle 28 to the annular expansion space 34. The rubber/fiber mix is extrusion molded into a cylindrical shape in which the lengths of the fibers 18 become stretched in the circumferential direction. This stretching action becomes progressively greater over the conically-shaped portion 43 of the expansion space 34 between the inlet and discharge locations 42, 44.

By reason of orienting the axis 40 of the expansion space 34 in a vertical direction, the cylindrical shape 50 within the space 34 is not deformed under gravitational forces so that it can be extruded to a consistent shape and size. The die element 38 is insignificantly deflected under the weight of the die element 36, with the gap (W) between the die elements 36, 38 maintained substantially constant. It is thus possible to produce a cylindrical shape 50 with minimal deformation. Preferably, the width W of the annular expansion space 34 is uniform between the inlet location 42 and the discharge location 44, whereby the cylindrical shape 50 that is extruded is formed by a flow that moves smoothly vertically without interruption so as to be substantially free from internal strain.

The die elements 36, 38 are configured so that the die surfaces 82, 84 on the die elements 36, 38, respectively, project in the conically-shaped portion 43 of the annular space 34 at an angle θ that is greater than or equal to 30° and less than 90°. The diameter D2 is preferably from 20 to 120 mm, with the diameter D3 from 100 to 440 mm. Preferably, the ratio of D3 to D2 is 1.5 to 12.5. Below these ranges, stretching in the circumferential direction near the discharge location 44 may be inadequate to effectively orient the lengths of the fibers 18 in the circumferential direction at the radially inner and outer surfaces of a relatively thick cylindrical shape 50. By exceeding these ranges, stretching in the circumferential direction may become excessive. In the event that the extruding pressure is low, the cylindrical shape may be prone to tearing.

To avoid excessive heat generation in the expansion space 34 between the dies 36, 38, a cooling system 88 may be utilized. The cooling system 88 may be used to circulate cooling fluid, such as water through the die 36. In an exemplary cooling system 88, cooling water is circulated by introducing water from outside of the die 36 so that the cooling water is forcibly directed by a pump 89 through a path within the die 36 and discharged to the die 38.

The removed portions 48 are circumferentially dimensioned to eliminate randomly oriented fibers 18 as well as those portions of the cylindrical shape 50 having a reduced thickness by reason of the collision of the circumferentially oppositely directed flow thereat. Typically, the circumferential dimension (D4×2) i.e. the arc length, is preferably 5 to 25% of the full circumferential extent of the cylindrical shape 50, and more preferably 10 to 25% thereof. Under 5%, features of the weld line 47 may remain at both ends of the resulting sheet 68. With an arc length over 25%, the scrap width becomes such that useable portion of the resulting sheet 68 is unnecessarily reduced. That is, the scrap may incorporate otherwise useable composition having the desired orientation of fibers 18.

Figure 4:
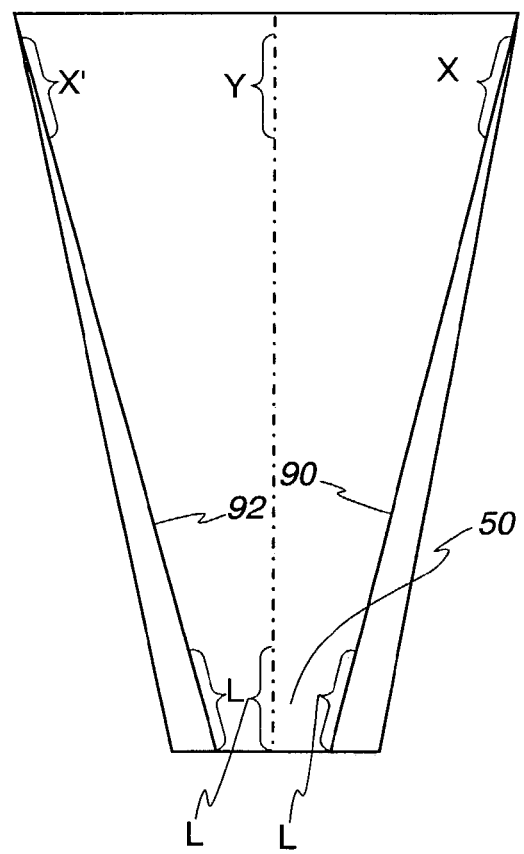
FIG. 4 is an elevation view of a portion of rubber material that is being cut and in transition between a cylindrical shape and a sheet form.
Figure 5:
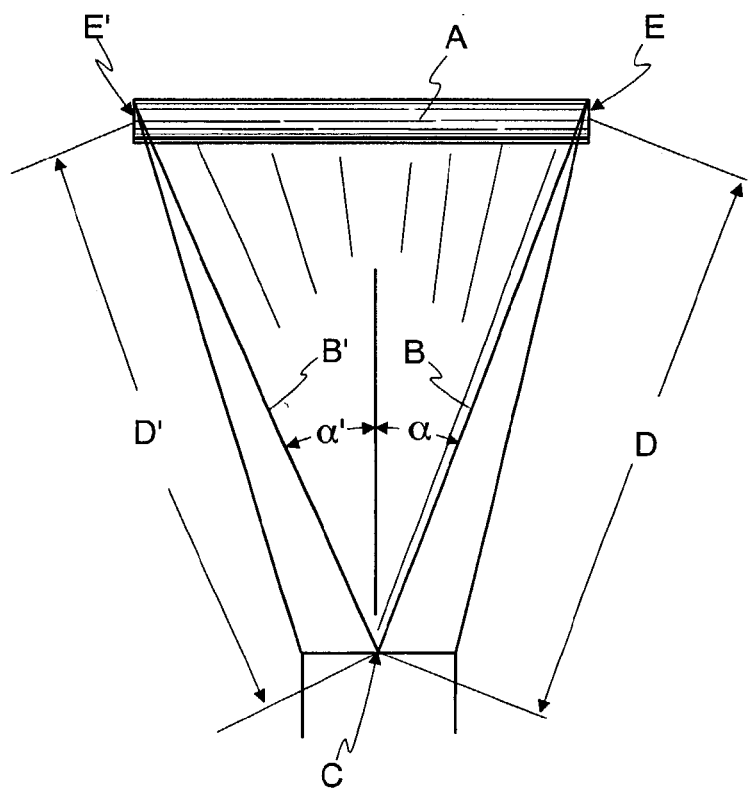
FIG. 5 is a fragmentary, elevation view of a part of the apparatus in FIG. 1 showing the transition of discharging rubber material between the cylindrical shape and sheet form.

As seen in FIG. 4, the cylindrical shape 50, when drawn vertically to be reconfigured into a sheet form, has a vertical longitudinal elongation percentage ($E_1$) at each edge 90, 92 as formed by the removed the portion 48. The vertical elongation percentage ($E_2$) of the other portions of the cylindrical shape, other than at the edges 90, 92, is less than the vertical elongation percentage $E_1$. The difference in the elongation ($E_1-E_2$) is preferably within a range of 0 to 5. Within this range, sheet flaring is effectively controlled. A difference in elongation over 5 produces a greater elongation of the edges 90, 92 compared to other portions of the cylindrical shape 50. This may result in a flaring of the ends of the resulting sheet 68 adjacent to the edges 90, 92.

As seen in FIG. 4, measurement of the elongation percentages $E_1$ and $E_2$ can be carried out by making marks at intervals of 10 cm in the vertical direction at the edges 90, 92 and at other portions of the cylindrical shape 50. The first 10 cm interval is identified as L for each measuring site, beginning immediately above the locations at which the cutting assembly 46 severs the cylindrical shape 50. The measured marks are identified on the sheet adjacent to the roll 66. As seen in FIG. 4, X, X' correspond to the interval L along the edges 90, 92 at the roll 66, with Y identifying the interval L at the roll 66 along another portion of the cylindrical shape 50. The vertical elongation of the edges 90, 92 is calculated by dividing (X−L) and (X'−L) by L. The vertical elongation of the other portions of the cylindrical shape is calculated by dividing (Y−L)) by L.

The cutting portions 54, 56 of the cutting assembly 46 may take a number of different forms. As examples, the cutting portions 54, 56 may each be a cutter, a knife, a laser, or an ultrasonic vibrational cutter. The cutting portions 54, 56 may be heated and maintained at an elevated temperature to facilitate cutting. Other cutting mechanisms are contemplated. Whatever cutting portion 54, 56 is utilized, it is desirable that the cutting portions 54, 56 sever the cylindrical shape 50 so as to remove the portion 48 to produce a sheet 68 having a uniform predetermined width and thickness, with consistently oriented fibers 18.

As seen in FIGS. 1 and 3, a blower 96 is situated within the space bounded by the cylindrical shape 50 so that cooled air and/or compressed air is directed at the radially inwardly facing surface 98 of the cylindrical shape 50 so as to impart a circumferential tension thereto immediately above the discharge location 44. This facilitates severance of the cylindrical shape 50 by the cutting portions 54, 56. In addition to circumferentially expanding the cylindrical shape 50, the cold, compressed fluid effects cooling thereof so as to avoid rubber scorching.

In a preferred form, the blower 96 consists of a plurality of nozzles 100 which direct pressurized fluid from a compressed fluid supply 102. The nozzles 100 distribute the compressed fluid in multiple directions to impart a radial force around the full circumferential extent of the surface 98 to effect expansion thereof. The quality of the rubber material can be stabilized by rapidly cooling the cylindrical shape 50.

As shown in FIG. 1, the sheet 68 extends over a guide roller 105 and is continuously wrapped upon the roll 66. Preferably, a liner 106 from a supply 108 thereof is placed against one side 110 of the sheet 68 immediately prior to wrapping the same around the roll 66.

While the nature of the rubber 16 may vary considerably, exemplary, suitable rubber materials are as follows: natural rubber, butyl rubber, styrene-butadiene rubber, chloroprene rubber, ethylene-propylene rubber, alkylated chlorosulfonated polyethylene, nitrile hydride rubber, a mixed polymer of nitrile hydride rubber and an unsaturated metal carbonate, and styrene-a-olefin elastomer made up of ethylene-propylene (EPR) or ethylene-propylene-dien monomer (EPDM). These rubbers may be used by themselves or in mixture. Examples of dien monomers are dicyclopentadiene, methylene norbornene, ethylidene norbornene, 1,4-hexadiene, and cyclooctadiene.

The fiber 18 added to the above rubber materials may be, for example, aramid fiber, polyamide fiber, polyester fiber, etc. Cotton may also be used. The fibers 18 have a length of from 1–10 mm, depending upon their nature. For example, aramid fibers preferably have a length of 3–5 mm, with 5–10 mm lengths preferred for polyamide fiber, polyester fiber, and cotton. Preferably, the fiber 18 is added in an amount of 10–40 weight parts per 100 weight parts of rubber.

A softener, a reinforcing agent including carbon black, a filler, an age resister, a vulcanization promoter, and a vulcanizer may be added to the rubber 16. Suitable softeners include general plasticizers for rubber including phthalate-based plasticizers such as dibutylphthalate (DBP) and dioctylphthalate (DOP), adipate-based plasticizers such as dioctyl adipate (DOA), sebacate-based plasticizers such as dioctyl sebcate (DOS), phosphates such as tricresyl phosphate, and/or general petroleum-based softeners.

In one exemplary operation, a master batch is prepared by kneading rubber and short fibers by means of an open roll or a kneader. 10–40 weight parts fiber are added per 100 weight parts polymer by an open roll. The kneaded master batch is discharged and cooled to 20–50° C. to prevent rubber scorching. A softener, in the amount of 1–10 weight parts, is added to the fibers. This enhances the affinity between the fibers and the rubber, improves dispersion of fibers in the rubber, and tends to avoid entanglement of the fibers with each other into a cotton-like state. More specifically, the softener penetrates into the fibers and acts as a lubricant to prevent entanglement.

After kneading the rubber with the fibers therein, the mixture is extruded through the cylinder and communicated to the expansion die within which the cylindrical shape is formed with the lengths of the fibers oriented in the circumferential direction.

The continuously extruded cylindrical shape has a thickness of from 1 to 10 mm, with staple fibers circumferentially directed fully between the radially inwardly facing surface and the radially outwardly facing surface of the cylindrical shape. The cutting portions 54, 56 are situated diametrically opposite to the location at which the expansion die is delivered rubber from the cylinder. The portion severed by the cutting portions 54, 56 includes the weld lines and is separated and delivered to an accumulation receptacle. The cylindrical shape with the portion removed is drawn vertically to be wrapped around a roll to produce a supply of the sheet material, useable, for example, as a component of a power transmission belt.

The effectiveness of the present invention is demonstrated below by comparative testing. The inventive method/apparatus was used to produce three Inventive Samples (Nos. 1–3). A Comparative Example was prepared.

In making all samples, an EPDM rubber mixture, as shown in Table 1, below, was used.

TABLE 1

| Mixed Chemicals | Weight Parts |
|---|---|
| EPDM | 100 |
| Nylon Cut Yarn | 15 |
| Aramid Cut Yarn | 5 |
| Stearic Acid | 1 |
| Zinc Oxide | 5 |
| Carbon Black | 50 |
| Oil | 10 |
| Antioxidant | 2 |
| N,N-m-Phenylene Dimaleimide | 2 |
| Peroxide | 8 |

Short fibers were added to the rubber and kneaded through an open roll. The kneaded batch was cooled to room temperature. This mixture and other additives were placed into a cylinder with a screw extruder, which thoroughly mixed the components. The extruded mixture was delivered to an expansion die from where a cylindrical shape was continuously discharged. Two knives, serving as cutting elements, were spaced in opposite circumferential directions from a weld line, located diametrically opposite to the point of introduction of extruded material to the expansion die. Scrap portions were removed. The cylindrical shape with the portions removed was drawn vertically to produce a sheet form. The sheet and a canvas liner were simultaneously wound around a roll.

For the sheet produced, the difference in elongation of the sheet ($E_1$–$E_2$), the occurrence of flaring at the edges of the sheet, and the uniformity of sheet thickness were determined. The results are shown in Table 2, below.

TABLE 2

| | Inventive Sample | | | Comparative Example |
|---|---|---|---|---|
| | 1 | 2 | 3 | 1 |
| Rubber Sheet Thickness (mm) | 3 | | | |
| Die Expansion Ratio | 3.76 | | | |
| Cylinder Temperature (° C.) | 90 (inlet location) | | | |
| | 95 (discharge location) | | | |
| Circumferential Length of Scrap Portion *1 | 10 | 16 | 25 | 0 |
| Difference in Elongation ($E_1$–$E_2$) *2 | 3 | 1 | 0 | 7–12 |
| Flare at Ends of sheet | None | None | None | Observed |
| Dispersion of Sheet Thickness: R-Value | 0.24 | 0.20 | 0.14 | 0.39 |

*1 Circumferential length when the cylindrical shape has an outer circumferential length of 100.
*2 $E_1$: Edge Elongation; $E_2$: Elongation for portions other than the edges.

The elongation measurements were made by marking at 10 cm intervals in the vertical direction on the edges where the portion of the circumferential shape was removed and elsewhere, immediately above the point of cutting. The elongation was calculated by taking a measurement using the same marks at a location immediately prior to rolling of the structure in sheet form.

As seen in Table 2, with the Inventive Samples, flaring of the sheet edges was prevented by limiting the difference in elongation between the edges and other portions to within an appropriate range. The variation in the sheet thickness was slight due to the fact that the portions were removed, including the weld lines and the portions immediately adjacent thereto.

On the other hand, in the Comparative Example, there was a significant difference in elongation of the edges, with resulting flaring of the sheet. The variation in sheet thickness was significant because the weld lines, and regions thereadjacent, were not removed.

The foregoing disclosure of specific embodiments is intended to be illustrative of the broad concepts comprehended by the invention.

The invention claimed is:

1. A method of manufacturing a rubber sheet containing short fibers, the method comprising the steps of:
   mixing short fibers in a flowable rubber matrix;
   forming the flowable rubber matrix with the fibers therein into a cylindrical shape with a circumferential extent using a die from which the flowable rubber matrix departs at a first location in the cylindrical shape;
   separating a portion of the circumferential extent of the cylindrical shape with the flowable rubber matrix with fibers therein in the cylindrical shape; and
   forming the cylindrical shape with the portion separated into a sheet form,
   wherein the step of separating a portion of the circumferential extent comprises separating from 5–25% of the circumferential extent by cutting the cylindrical shape adjacent to the first location.

2. The method of manufacturing a rubber sheet containing short fibers according to claim 1 wherein the short fibers have a length and the step of forming the rubber matrix comprises orienting the short fibers so that the lengths of the short fibers extend in a circumferential direction in the cylindrical shape.

3. The method of manufacturing a rubber sheet containing short fibers according to claim 1 wherein the step of forming the cylindrical shape into a sheet form comprises continuously forming the cylindrical shape into a sheet form while separating the portion of the circumferential extent from the cylindrical shape.

4. The method of manufacturing a rubber sheet containing short fibers according to claim 1 wherein the step of forming the flowable rubber matrix comprises extruding the flowable rubber matrix in an annular expansion die.

5. The method of manufacturing a rubber sheet containing short fibers according to claim 4 further comprising the step of cooling the annular expansion die.

6. The method of manufacturing a rubber sheet containing short fibers according to claim 5 wherein the expansion die comprises a first element and a cooperating second element surrounding the first element and the step of cooling the annular expansion die comprises circulating a cooling fluid through at least one of the first and second elements.

7. The method of manufacturing a rubber sheet containing short fibers according to claim 1 wherein the cylindrical shape has a first axis and the step of forming the flowable rubber matrix comprises directing the flowable rubber matrix into an annular die in a direction substantially orthogonally to the first axis.

8. The method of manufacturing a rubber sheet containing short fibers according to claim 7 wherein the step of forming the flowable rubber matrix comprises causing the flowable rubber matrix to flow in circumferentially opposite directions around the first axis and meet at a weld line and the step of separating a portion of the cylindrical shape comprises separating a portion including the weld line.

9. The method of manufacturing a rubber sheet containing short fibers according to claim 8 wherein the step of separating a portion of the cylindrical shape comprises separating a portion of the cylindrical shape having a circumferential width between circumferentially spaced ends with the weld line between and spaced from each of the circumferentially spaced ends.

10. The method of manufacturing a rubber sheet containing short fibers according to claim 7 wherein the step of forming the flowable rubber matrix comprises advancing the flowable rubber matrix through an extruding screw, the extruding screw having a second axis that is substantially orthogonal to the first axis.

11. The method of manufacturing a rubber sheet containing short fibers according to claim 1 wherein the step of forming the flowable rubber matrix comprises extruding the flowable rubber matrix in an annular expansion die having a conical shape.

12. The method of manufacturing a rubber sheet containing short fibers according to claim 1 further comprising the step of reprocessing the portion of the cylindrical shape to form a part of a rubber sheet containing short fibers.

13. The method of manufacturing a rubber sheet containing short fibers according to claim 1 wherein the cylindrical shape has a first axis, the sheet has an edge formed at where the portion is separated, and the step of forming the cylindrical shape into a sheet form comprises stretching the cylindrical shape so that the cylindrical shape has an elongation ratio $E_1$ at the edge along the first axis and an elongation ratio $E_2$ along the first axis at a location spaced circumferentially from the edge, with $E_1$–$E_2$ within the range of 0–5.

14. The method of manufacturing a rubber sheet containing short fibers according to claim 1 wherein the step of forming the flowable rubber matrix into a cylindrical shape comprises forming the flowable rubber matrix into a cylindrical shape having a first axis extending in a vertical direction.

15. The method of manufacturing a rubber sheet containing short fibers according to claim 1 wherein the step of separating a portion of the cylindrical shape comprises tensioning the cylindrical shape in a circumferential direction as the portion of the cylindrical shape is separated.

16. The method of manufacturing a rubber sheet containing short fibers according to claim 15 wherein the cylindrical shape has a radially inwardly facing surface and a radially outwardly facing surface and the step of tensioning the cylindrical shape comprises directing a compressed fluid against the radially inwardly facing surface.

17. The method of manufacturing a rubber sheet containing short fibers according to claim 1 further comprising the step of cooling the cylindrical shape as the portion of the cylindrical shape is separated.

18. The method of manufacturing a rubber sheet containing short fibers according to claim 17 wherein the cylindrical shape has a radially inwardly facing surface and a radially outwardly facing surface and the step of cooling the cylindrical shape comprises spraying a cooling fluid against the radially inwardly facing surface.

19. The method of manufacturing a rubber sheet containing short fibers according to claim 18 wherein the cooling fluid is at least one of air and a compressed gas.

20. The method of manufacturing a rubber sheet containing short fibers according to claim 1 wherein the step of separating a portion of the cylindrical shape comprises cutting the cylindrical shape using one of a knife, a laser cutter, a heated knife, and an ultrasonic vibrational cutter.

21. The method of manufacturing a rubber sheet containing short fibers according to claim 1 further comprising the step of continuously wrapping the sheet form around a roll as the sheet form is formed.

22. The method of manufacturing a rubber sheet containing short fibers according to claim 1 wherein the step of separating a portion of the circumferential extent comprises separating a portion of the circumferential extent using first and second spaced components at the first location that are each at least one of a knife, a laser cutter, a heated knife, and an ultrasonic vibrational cutter.

23. A method of manufacturing a rubber sheet containing short fibers, the method comprising the steps of:
  mixing short fibers in a flowable rubber matrix;
  forming the flowable rubber matrix with the fibers therein into a cylindrical shape with an axis and a circumferential extent and a weld line extending along the axis using a die from which the flowable rubber matrix departs at a first location in the cylindrical shape;
  separating a portion of the circumferential extent including the weld line from the cylindrical shape at a single circumferential location; and
  forming the cylindrical shape with the portion separated into a sheet form,
  wherein the step of separating a portion of the circumferential extent comprises separating from 5–25% of the circumferential extent by cutting the cylindrical shape adjacent to the first location.

* * * * *